United States Patent
Nussbaumer

(10) Patent No.: US 8,729,758 B2
(45) Date of Patent: May 20, 2014

(54) ROTATIONAL MACHINE, METHOD FOR THE DETERMINATION OF A TILTING OF A ROTOR OF A ROTATIONAL MACHINE, AS WELL AS A PROCESSING PLANT

(75) Inventor: Thomas Nussbaumer, Zurich (CH)

(73) Assignee: Levitronix GmbH, Zurich (CH)

( * ) Notice: Subject to any disclaimer, the term of this patent is extended or adjusted under 35 U.S.C. 154(b) by 331 days.

(21) Appl. No.: 12/936,993

(22) PCT Filed: Apr. 30, 2008

(86) PCT No.: PCT/EP2008/055367
§ 371 (c)(1),
(2), (4) Date: Oct. 8, 2010

(87) PCT Pub. No.: WO2009/132707
PCT Pub. Date: Nov. 5, 2009

(65) Prior Publication Data
US 2011/0031836 A1 Feb. 10, 2011

(51) Int. Cl.
*H02K 7/09* (2006.01)
*F16C 32/04* (2006.01)
(52) U.S. Cl.
CPC ............... *H02K 7/09* (2013.01); *F16C 32/044* (2013.01); *F16C 32/0444* (2013.01); *F16C 32/0446* (2013.01); *F16C 32/0493* (2013.01)
USPC ........................................ 310/90.5; 310/68 B
(58) Field of Classification Search
CPC ............ H02K 7/09; H02K 7/04; H02K 29/06; H02K 29/08; F16C 32/044; F16C 32/0444; F16C 32/0446; F16C 32/493

USPC .................................. 310/90.5, 68 B, 90, 91
IPC ..................................... H02K 7/09; F16C 32/04
See application file for complete search history.

(56) References Cited

U.S. PATENT DOCUMENTS

| | | | |
|---|---|---|---|
| 3,845,995 A | | 11/1974 | Wehde |
| 4,562,430 A | * | 12/1985 | Robinson ...................... 324/660 |
| 6,071,093 A | | 6/2000 | Hart |
| 6,297,574 B1 | * | 10/2001 | Schob et al. ................. 310/90.5 |
| 6,355,998 B1 | * | 3/2002 | Schob et al. ................. 310/68 B |

(Continued)

FOREIGN PATENT DOCUMENTS

| | | |
|---|---|---|
| DE | 38 19 205 A1 | 6/1989 |
| EP | 0 982 836 A2 | 3/2000 |

(Continued)

*Primary Examiner* — John K Kim
(74) *Attorney, Agent, or Firm* — Kilpatrick Townsend & Stockton LLP

(57) ABSTRACT

A bearing-free engine includes a bearing and drive stator having a magnetic stator plane and a magnetic rotor having a magnetic rotor plane and supported magnetically in contact free manner within the stator. The axial height of the rotor is smaller than or equal to a half diameter of the rotor. The rotor is stabilized passively by reluctance forces against axial displacement and tilting. A first sensor signal from a first measurement zone of the rotor is evaluated by a first sensor and a second sensor signal from a second measurement zone of the rotor is evaluated by a second sensor. To determine the tilting of the rotor, at least 50% of the first sensor signal from the first measurement zone is generated from a first control measurement zone which is a part of the first measurement zone disposed either below or above the magnetic rotor plane.

33 Claims, 11 Drawing Sheets

(56) References Cited

U.S. PATENT DOCUMENTS

Figure 1:
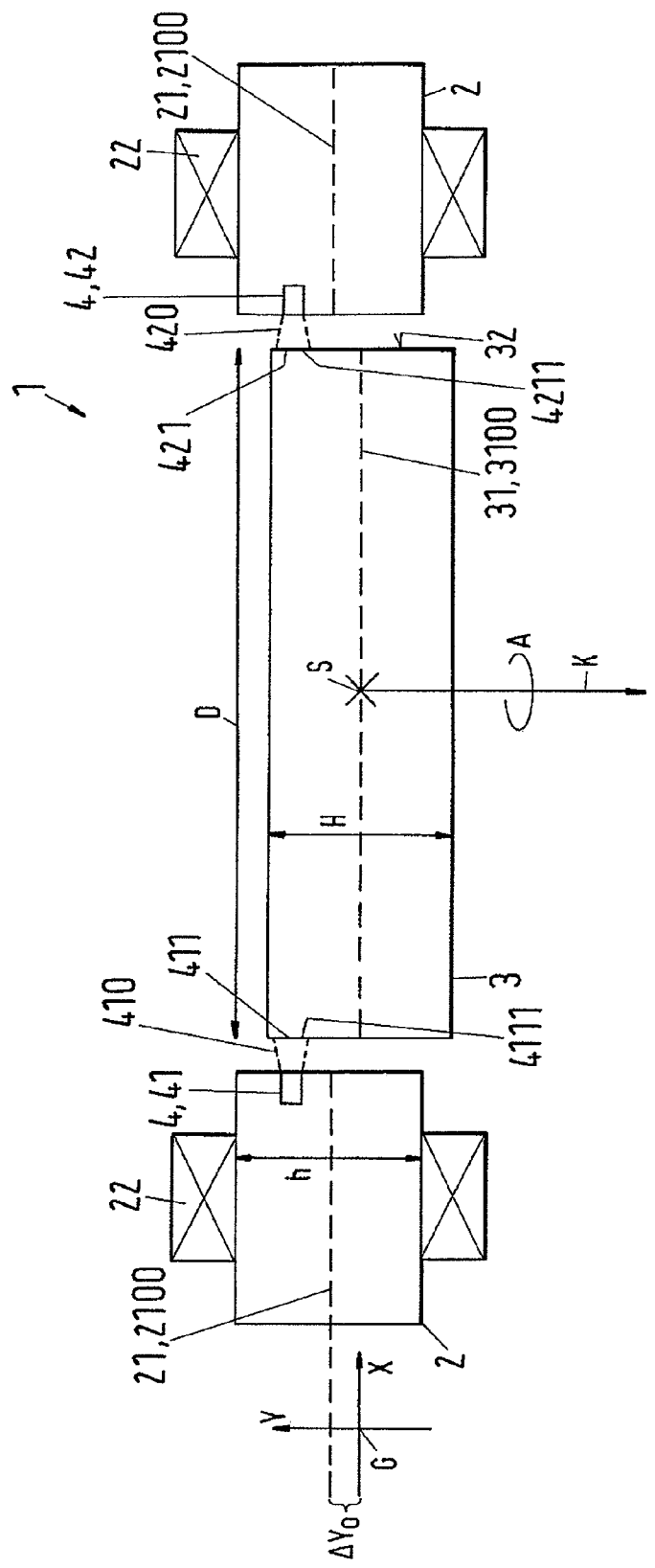

| | | |
|---|---|---|
| 6,662,466 B2 | 12/2003 | Gurer et al. |
| 6,664,680 B1 * | 12/2003 | Gabrys ........................ 310/74 |
| 6,794,780 B2 * | 9/2004 | Silber et al. ................ 310/90.5 |
| 7,683,514 B2 * | 3/2010 | Onuma et al. ............... 310/90.5 |
| 7,800,269 B2 * | 9/2010 | Onuma et al. ............... 310/90.5 |
| 2004/0009295 A1 | 1/2004 | Kobayashi et al. |
| 2008/0073993 A1 * | 3/2008 | Sortore et al. .............. 310/90.5 |
| 2009/0079284 A1 * | 3/2009 | Onuma et al. ............... 310/90.5 |
| 2009/0243413 A1 * | 10/2009 | Gilchrist et al. ............ 310/90.5 |
| 2009/0315421 A1 * | 12/2009 | Onuma et al. ............... 310/90.5 |
| 2011/0031836 A1 * | 2/2011 | Nussbaumer ................ 310/90.5 |

FOREIGN PATENT DOCUMENTS

| | | |
|---|---|---|
| EP | 0 986 162 A1 | 3/2000 |
| EP | 1 063 753 A1 | 12/2000 |
| WO | WO 96/31934 A1 | 10/1996 |
| WO | WO 98/11650 A1 | 3/1998 |

\* cited by examiner

ROTATIONAL MACHINE, METHOD FOR THE DETERMINATION OF A TILTING OF A ROTOR OF A ROTATIONAL MACHINE, AS WELL AS A PROCESSING PLANT

CROSS REFERENCE TO RELATED APPLICATIONS

This application is a National Stage of International Application No. PCT/EP2008/055367 filed Apr. 30, 2008, the disclosure of which are incorporated herein by reference.

The invention relates to a rotational machine adapted as a bearing-free engine, a method for the determination of a tilting of a rotor of a rotational machine as well as a processing plant, in particular a wafer processing plant, a biological reactor plant, a pump or mixer in accordance with the preamble of the independent claim of the respective category.

In particular the invention relates to a rotational machine for an apparatus and a method for rotationally coating a surface of a wafer with a polymer liquid, in particular a photoresist.

In semiconductor technology and in microelectronics—for example for the production of integrated circuits—the method of rotationally coating (spincoating) is used to produce a layer on the surface of a substrate by means of a fluid.

To produce integrated circuits or microelectronic structures it is necessary to transfer geometric shapes, such as conductor paths onto the wafer. Generally this occurs with the aid of a lithographic process in which initially a thin layer of a photoresist is applied to the surface of the wafer. Following the drying thereof the desired geometric structure is exposed thereto by impinging this layer with electromagnetic radiation—typically UV light—through a mask. At those points where the mask does not overlap the photoresist layer, the solubility of the photoresist layer is either increased by exposure (positive photoresist) or reduced (negative photoresist), so that in the subsequent processing step either the regions not covered by the exposure or the regions covered by the exposure are separated there from.

On rotational coating the layer is generated on the surface of the wafer in that the wafer is arranged on a rotary disc (chuck), the rotary disc is put into rotation and then by means of a metering unit a pre-settable amount of a polymer liquid which contains a solvent besides the polymer is applied over the center of the wafer. By the rotation of the rotary disc, which typically occurs at 100 to 6000 revolutions per minute, the polymer liquid is distributed as a thin layer on the wafer surface. To generate a hard layer the solvent has subsequently to be removed which can be supported by rotation—typically at a lower speed—or by heating the wafer and/or the process chamber. Such processes are disclosed, for example, in U.S. Pat. No. 6,662,466 or in US-A-2004/0009295.

An essential aspect of the production of the photoresist layers is that the variation in the layer thickness considered over the total wafer surface should be kept as small as possible. Amongst other things this is due to the fact that due to the extremely small structures which are exposed onto the wafer the shortest possible short wave length light is used whereby the depth of sharpness of the exposure is very small, e.g. 150 nm.

Furthermore, it is endeavored to achieve very thin layers and to use the photoresist as efficiently as possible because it is a question of relatively expensive substances in this respect. A scattering of the photoresist from the wafer surface should be avoided as much as possible. For this reason efforts have been made to set the parameters which influence the thickness of the achieved layer as precisely as possible. These parameters include the rotational speed of the rotary disc, the temperature of the wafer and the viscosity of the polymer liquid, to mention only a few.

A so-called bearing-free engine can be provided as a drive for such units and includes a stator designed as a bearing and drive stator and a magnetic rotor supported magnetically in contact free manner within the stator. Such engines have been known for a long time and are being used more and more because of their particular advantages, namely in particular because of their stable running properties and the lack of any mechanical bearings at the rotor and particular in many special applications as pumps or as metering units, e.g. in the semiconductor industry for the handling of mechanically aggressive liquids such as slurry. Such a rotational drive is described e.g. in EP 1 063 753.

Another classical area of application of such bearing-free engines is the treatment of sensitive or highly pure liquids. For example, the technology of the bearing-free engines is used very advantageously in blood pumps or in bio-reactors, or for the handling of highly sensitive and/or highly pure liquids in the pharmaceutical and chemical industries, as well as generally in medical science and/or medical technology.

The generation of force for the magnetic support of the bearing-free engines in a shrunk on disc design in accordance with EP 1 063 753 in this respect occurs in only one plane, namely in the plane of the rotor. The rotor is actively stabilized in this plane in both radial directions, wherein the stabilization in the axial direction and the stabilization of the tendency to tilt is achieved in these known engines purely passively through reluctance forces.

The active regulation of the position in each of the two radial directions of the rotor occurs by means of at least one sensor for each direction arranged at the stator circumference, the sensor measuring the distance of the rotor from the stator. Alternatively, it is possible also to deploy two or more sensors for each direction for reasons of improved linearity or resolution, wherein in dependence of their deployment the position in this direction is determined by forming a difference and/or a sum in a manner known to the person of ordinary skill in the art.

A movement of the rotor from the desired position of the rotor in a certain direction, e.g. by a disturbing influence e.g. leads to a reduction of the signal at the distance sensor, which then leads to a decrease in the field in the air gap on precisely this side and which then leads to an increase in the field on the opposite side by correspondingly regulated coils through which current flows and which produces a field. This effects a movement of the rotor in the direction of the desired position and thus an active radial stabilization.

A minimal axial tilting of the rotor, e.g. by a disturbing influence, can likewise lead to a change in the sensor signal which is interpreted by the regulator as a change in the radial position.

Such minimal tilting of the rotor has so far not been an essential problem for known bearing-free engines since this tilting is automatically damped by reluctance forces present between the stator and the rotor in combination with further dampingly acting mechanisms, such as e.g. the viscous properties of the liquid in which the rotor moves.

However, it has been shown that under certain conditions these automatic damping mechanisms no longer work or at least do not work sufficiently.

For example, it would thus be desirable to adapt a coating apparatus for the rotational coating of a wafer, as was briefly described above, such that the rotating support body which carries the wafer on rotational coating is not connected to a drive in a complicated manner, but that the rotational support body itself simultaneously forms the rotor of a corresponding bearing-free engine.

In practice the wafers to be coated have a diameter of e.g. up to 300 mm or more. Moreover, in the case that the support body itself forms the rotor of the bearing-free engine the support body must have a relatively large mass so that the support body can counter external influences acting on its equilibrium position with a sufficiently large moment of inertia so that a sufficiently stable running of the rotor is ensured in the operational state.

A comparatively large mass of the support body and thus of the rotor has the result that the weight force of the rotor is no longer small with reference to the present magnetic reluctant forces so that the rotor in the equilibrium state undergoes a certain displacement in the direction of the gravitational force acting on the rotor relative to the stator.

It has now been established that this has the consequence that even small disturbances in certain cases, which initially only lead to a small tilting of the rotor, can be amplified by the radially active regulation such that, in the worst case, the rotor is hurled out of the stator and/or the tilting can no longer be stabilized. In general, this naturally leads to significant damage to the rotational machine itself and to those units in which the rotational machine is used as a drive.

Starting from the prior art it is therefore an object of the invention to provide a rotational machine, an apparatus having a rotational machine and a method for operating a rotational machine, in particular an apparatus and a method for rotationally coating a surface of a substrate, in particular a wafer, in which, with reference to a tilting movement, a stable running of the rotor is also ensured when the rotor has such a large mass that its weight is no longer negligible when compared to the reluctance forces acting between the stator and rotor. In particular, the apparatus and the method should also but not only be suitable for the coating of a surface of a wafer with a polymer liquid, in particular a photoresist.

The subject matters of the invention satisfying these objects in an apparatus respect and in a method respect are characterized by the independent claims of the respective category.

The respective dependent claims relate to particularly advantageous embodiments of the invention.

Thus, in accordance with the invention a rotational machine adapted as a bearing-free engine is provided including a stator designed as a bearing and drive stator having a magnetic stator plane and a magnetic rotor having a magnetic rotor plane and supported magnetically in contact free manner within the stator, wherein an axial height of the rotor is smaller than or equal to a half diameter of the rotor and the rotor is stabilized passively by reluctance forces with respect to the magnetic stator plane both against an axial displacement and also against a tilting from an equilibrium position. A sensor unit having a first sensor and a second sensor is provided at the stator such that for the determination of a deflection of the rotor from the equilibrium position a first sensor signal from a first measurement zone of the rotor can be evaluated by means of the first sensor and a second sensor signal from a second measurement zone can be evaluated by means of the second sensor. In accordance with the invention for the determination of the tilting of the rotor relative to the magnetic stator plane a first control measurement zone which is part of the first measurement zone is provided either below or above the magnetic rotor plane at the rotor such that at least 50% of the first sensor signal which can be generated from the first measurement zone can be generated by the first control measurement zone at the first sensor.

In the following the essential features of the rotational machine in accordance with the invention and its geometric design are described briefly in a schematic manner with reference to FIGS. 1 to 8b to arrive at a clearer illustration of the invention.

In a schematic illustration, FIG. 1 shows a simple embodiment of a rotational machine in accordance with the invention, which will be referred to totally using the reference numeral 1 in the following and in which illustration the rotor is present in the equilibrium position.

The rotational machine 1 in accordance with the invention is adapted as a bearing-free engine which includes a stator 2 designed as a bearing and drive stator and includes a magnetic rotor 3 supported magnetically in contact free manner within the stator 2.

In this respect in the scope of this application an engine is to be understood under the term bearing-free engine which forms an electromagnetic rotational drive and which includes a magnetic, preferably permanent magnetically activated rotor 3 and a stator 2, wherein the rotor 3 is supported by means of magnetic forces in contact free manner. The characteristic from which the bearing-free engine receives its name is that it has no separate magnetic bearings for the rotor 3. For this purpose, the stator 2 is designed as a bearing and drive stator and the rotor 3 is designed as a passive magnetic rotor 3 which serves both as a bearing rotor and also as a drive rotor. The stator 2 is designed such that it generates an electromagnetic rotational field or is provided with electric windings 22 which, on the one hand, imposes a torque on the rotor 3 which drives its rotation about the rotational axis A and which, on the other hand, imposes an arbitrarily settable transverse force onto the rotor 3 so that its radial position in relation to a plane perpendicular to the rotational axis A is pre-settable and/or can be actively controlled. Thus, in the operational state the rotor 3 is actively controllable and/or drivable by means of the electric coils of the stator 2 in relation to three degrees of freedom, namely the rotation about the rotational axis, as well as the radial position in the plane perpendicular to the rotational axis (two degrees of freedom).

In relation to three further degrees of freedom namely tilting relative to the plane perpendicular to the rotational axis A (two degrees of freedom) and the axial position Y, the rotor 3 of the bearing-free engines known in the prior art is passively magnetic, i.e. it is non-controllable and is stabilized by reluctance forces. Thus, in the operational state the rotor 3 is not only drivable through the magnetic interaction between the bearing/drive stator 2 and the rotor 3, but is also supportable in contact free manner without any separate magnetic bearings being present for this purpose.

The term "bearing-free engine with magnetic rotor" is to be understood in this sense in the scope of this application. With regards to further details of the design and the controllability and/or the regulatability of the bearing-free engine, one is referred to e.g. EP 0 986 162 or to WO-A-96/31934, in which such a bearing-free engine is disclosed with reference to a rotational pump.

An essential characteristic of such bearing-free engines is a rotor 3 whose axial height H is smaller than or equal to a half diameter D of the rotor 3 so that the rotor 3 can be stabilized passively through the above-mentioned reluctance forces with respect to the magnetic stator plane 21 both against an axial displacement $\Delta Y$ and also against a tilting $\Delta \alpha$ from an equilibrium position G. The geometric arrangement of the stator 2 with electric windings 22 and the rotor 3 which is arranged within the stator 2 and whose height H is smaller than a half diameter D is illustrated very clearly in FIG. 1.

In this respect the rotor 3 can, amongst other things, be designed in the form of a compact disc or also as a ring, that this can be designed with a recess at its center. A rotor 3 designed as a ring is also particularly preferably used in the present invention. In particular for large rotors 3, the design of the rotor 3 as a ring above all has the advantage, beside its specific magnetic properties, that such a ring-shaped rotor 3 naturally also has significantly less weight than a disc-shaped rotor 3 having the same outer dimensions since in a ring-shaped rotor 3 a considerable amount of material is saved by providing a recess in the center of the rotor 3.

The rotor of FIG. 1 is in its equilibrium position G with regard to all three directions in space. In this respect the relative position of the three directions in space to one another is essentially defined by the direction K of the gravitational force which is shown in accordance with the illustration in FIG. 1 downwardly and thus opposite to the direction in space Y. In accordance with the illustration a coordinate system is introduced on the left in FIG. 1 which defines the relative positions of the directions in space Y and X, where X symbolizes the two orthogonal radial directions symbolized with reference to the rotational machine 1 and the direction of the gravitational force K.

As can clearly be seen from FIG. 1, the rotor 3 has a certain offset by the distance $\Delta Y_0$ in the direction of the gravitational force K in the equilibrium position G. This offset by the distance $\Delta Y_0$ is due to the relatively large mass of the rotor 3 which technically is a non-negligible size for the rotational machine 1 in accordance with the invention. In this respect this differentiates the rotational machine 1 of the present invention significantly from the bearing-free engines known from the prior art, as are described, for example, in the previously mentioned EP 0 986 162 or in WO-A-96/31934.

Naturally, the rotors known from the prior art also have a mass which generally leads to a small offset in the direction of the gravitational force from the equilibrium position. However, the gravitational force acting on the light rotors known from the prior art has such a small effect in comparison to the reluctance forces which, among other things, stabilize the axial position of the rotor so that they can be neglected for all practical problems which relate to the stabilization of the rotor against an axial displacement or tilting. In particular in known rotors, their weight is also negligibly small relative to other forces which can act on the rotor, e.g. with regard to hydrodynamic forces which act on the rotor in a pump. For this reason such rotational machines known from the prior art as a rule can also be operated in all positions in relation to the gravitational force. In contrast thereto a rotational machine in accordance with the invention which has a heavy rotor which has a weight force which is non-negligible in relation to the reluctance forces can as a rule not be operated in any arbitrary position in relation to the gravitational force. Unless the rotational machine in accordance with the invention is operated under very special circumstances, for example, in a sufficiently viscous medium or also e.g. when the tilting of the rotational machine as a whole against the direction of the gravitational force is sufficiently small.

Since the mass of the rotor 3 of a rotational machine 1 in accordance with the invention leads to a non-negligible offset $\Delta Y_0$ in the direction K of the gravitational force, generally a differentiation between the magnetic planes of the rotor 3 and the stator 2 and their associated geometric planes is necessary in the present invention. This differentiation will be explained more precisely with reference to FIG. 2.

In the simple example of FIG. 1 the magnetic rotor plane 31 and the geometric rotor plane 3100 are identical since the rotor 3 is a permanent magnet geometrically designed as a rotor 3. The geometric rotor Plane 3100 which is defined as half the height H of the rotary disc of the rotor 3 is thereby the same as the magnetic rotor plane 31 which is decisive for the reluctance forces acting on the rotor 3.

Since the rotor 3 of FIG. 1 is designed homogeneously with regard to its mass distribution, the center of gravity S of the rotor 3 additionally lies in the magnetic rotor plane 31 and the geometric rotor plane 3100. Thus, in the operational state the rotor 3 rotates perpendicular to the rotor planes 31, 3100 about the rotational axis A which is symbolized by the arrow A and which runs perpendicular to the rotor planes 31, 3100 through the center of gravity S.

The stator 2 of FIG. 1 is essentially made from a ferromagnetic or a permanent magnetic material such that the magnetic stator plane 21 is defined by the geometric stator plane 2100 which is defined as half the height h of the stator 2 this is e.g. the case when the stator 2 of FIG. 1 is a homogeneous iron ring or a ring of iron sheet metal.

As an essential installation a sensor unit 4 having a first sensor 41 and a second sensor 42 is provided at the stator 2 such that for the determination of a deflection of the rotor 3 from the equilibrium position G a first sensor signal 410 from a first measurement zone 411 of the rotor 3 can be evaluated by means of the first sensor 41 and a second sensor signal 420 from a second measurement zone 421 of the rotor 3 can be evaluated by means of the second sensor 42.

This means that a rotational machine 1 in accordance with the invention includes at least two measurement sensors 41, 42 which by way of measurement techniques preferably form a sensor pair with which a deflection of the rotor from the equilibrium position G, in particular a tilting $\Delta \alpha$ and a radial displacement in the direction X from the equilibrium position G is detectable.

In principle it is already known from the prior art to provide sensors at the stator which can determine a radial displacement of the rotor in the direction X from the equilibrium position G. Also e.g. the bearing-free engines in accordance with EP 0 986 162 and WO-A-96/31934 require such sensors so that a stable position of the rotor in the operational state is settable and/or regulatable with regard to the radial direction.

For the known bearing-free engines in which the weight of the rotor is essentially negligible as was described above, also a possible tilting movement of the rotor in the operational state at most plays a subordinate role, as these essentially are stabilized and damped automatically, e.g. via the reluctance forces and/or by hydrodynamic forces which act e.g. on the rotor via a fluid. In particular, in the known bearing-free engines tilting movements or oscillations about the magnetic rotor axis possibly acting in the operational state are not amplified by the active regulation of the radial position of the rotor, or are at least not amplified so much that the rotor is destabilized in relation to the axial direction and/or in relation to the mentioned tilting movements. Thus, in the known bearing-free engines the tilting movements or oscillations about the magnetic rotor axis have so far not played a role in practice. In particular, in this type of bearing-free engine it practically plays no role in practice at which position of the stator the sensors are provided for stabilization of the radial position of the rotor and/or from which region of the rotor the sensors obtain their measurement signal. For all practical applications these factors do not play a role. The radial position of the rotor is always stabilized as long as the sensor receives a sufficiently large signal strength from the rotor, wherein it does not play a role from which region of the rotor the signal stems.

However, the situation is completely different when the rotor 3 does not have a negligible weight as is the case for the rotational machine 1 in accordance with the invention, so that the rotor 3 already undergoes an offset by the distance $\Delta Y_0$ in direction of the gravitational force K in an equilibrium position G and without other forces than the reluctance forces and the gravitational force K acting on the rotor.

In this respect this essential difference with regard to the stability of the rotor in respect to the tilting movements is, amongst other things, caused in that in the known bearing-free engines the reluctance forces and/or the hydrodynamic forces are large in comparison to the weight forces which act on the rotor due to its mass. A rotor which satisfies this condition is also referred to as a light rotor in the scope of this application. For this reason it is also possible to operate the known bearing-free engines with light rotors in every desirable position and direction in relation to the gravitational force without a problem, as in the combination of all of the acting forces the weight force of the rotor is negligibly small for all practical aspects in combination with a stable support.

It is now an essential recognition of the present invention that in the case in which the mass of the rotor 3 is not negligibly small, i.e. in the case that a so-called heavy rotor 3 is used, the region of the circumferential surface 32 of the rotor 3 from which the sensor 41, 42 obtains its sensor signal 410, 420 plays a considerable role.

Surprisingly it has namely been shown that in a rotor 3 which is offset due to its large mass by $\Delta Y_0$ in direction of the gravitational force K, that a complete destabilization of the rotor 3 in the operational state can occur, so that the regulator which should stabilize the radial position of the rotor 3 in the X direction does not damp tilting movements occurring with regard to the magnetic stator plane 21 but even amplifies these and, indeed, depending on the region of the circumferential surface 32 of the rotor 3 from which the sensor 41, 42 obtained its sensor signal 410, 420.

Thus, for the first time it could be shown through the invention that there are very specific regions at the circumferential surface 32 of the rotor 3, in which the sensor 41, 42 produces a sensor signal 410, 420 which leads to a tilting movement of the rotor 3 no longer being amplified, but that it is damped by the active magnetic radial regulator so that the rotor 3 is stabilized with regard to the tilting movements which occur.

However, if the sensor signal 410, 420 for the active magnetic radial regulation of the rotor 3 is not obtained from the regions of the circumferential surface 32 of the rotor 3 disclosed by the present invention, the tilting movement of the rotor 3 can even be amplified through the active magnetic radial regulation and indeed can be amplified so much in the worst case that the rotor 3 is hurled out of the stator 2 which in many cases can lead to the destruction of the rotational machine 1 or at least to severe damage thereto.

Thus, through the present invention clear conditions for the reception and/or for the origin of the sensor signal 410, 420 were able to be defined for the first time under which a tilting movement or tilting oscillation of the rotor 3 can actively be damped through the regulator so that the position of the rotor 3 is also stabilized in the operational state against tilting oscillations.

In this respect it does not play a significant role at which position of the stator 2 the sensor 41, 42 is provided. It is only critical from which regions of the circumferential surface 32 of the rotor 3 the sensor 41, 42 obtains its sensor signal 410, 420 and in which ratio the sensor 41, 42 receives signal intensities from the different regions of the rotor 3. This means it ultimately depends on the "viewing direction" of the sensor. For example, it can be possible that the sensor 41, 42 is arranged at the upper boundary of the stator 2 for reasons of a simple design; however, with regard to the magnetic stator plane 21 and/or with regard to the magnetic rotor plane 31 it is arranged such that it receives its sensor signal 410, 420 from a region below the magnetic rotor plane 31.

This means the sensor 41, 42 itself can be geometrically arranged in an instable region with regard to the circumferential surface 32 of the rotor 3 when it is arranged such that it receives its sensor signal 410, 420 from a region and with a sufficient signal strength in accordance with the present invention.

To achieve an active stabilization against tilting $\Delta\alpha$ of the rotor 3 with regard to the magnetic stator plane 21, a first control measurement zone 4111 which is part of the first measurement zone 411 is provided either below or above the magnetic rotor plane 31 at the rotor 3 such that at least 50% of the first sensor signal 410 which can be generated from the first measurement zone 411 can be generated by the first control measurement zone 4111 at the first sensor 41 in accordance with the invention.

The significance and the positioning of the measurement zones 411, 412 and/or of the first control measurement zone 4111 which is associated with the first sensor 41 and of the second control measurement zone 4211 which is associated with the second sensor 42 will be described in more detail with reference to FIG. 3 and FIG. 4.

The significance of the statement that at least 50% of the first sensor signal 410 which can be generated from the first measurement zone 411 has to be generated by the first control measurement zone 4111 at the first sensor 41 to achieve a stabilization of the tilting of the rotor 3 in the operational state will be described with reference to FIG. 5.

In the following the difference between the magnetic and geometric planes of stator 2 and rotor 3 will be described briefly with reference to FIG. 2.

Figure 2:
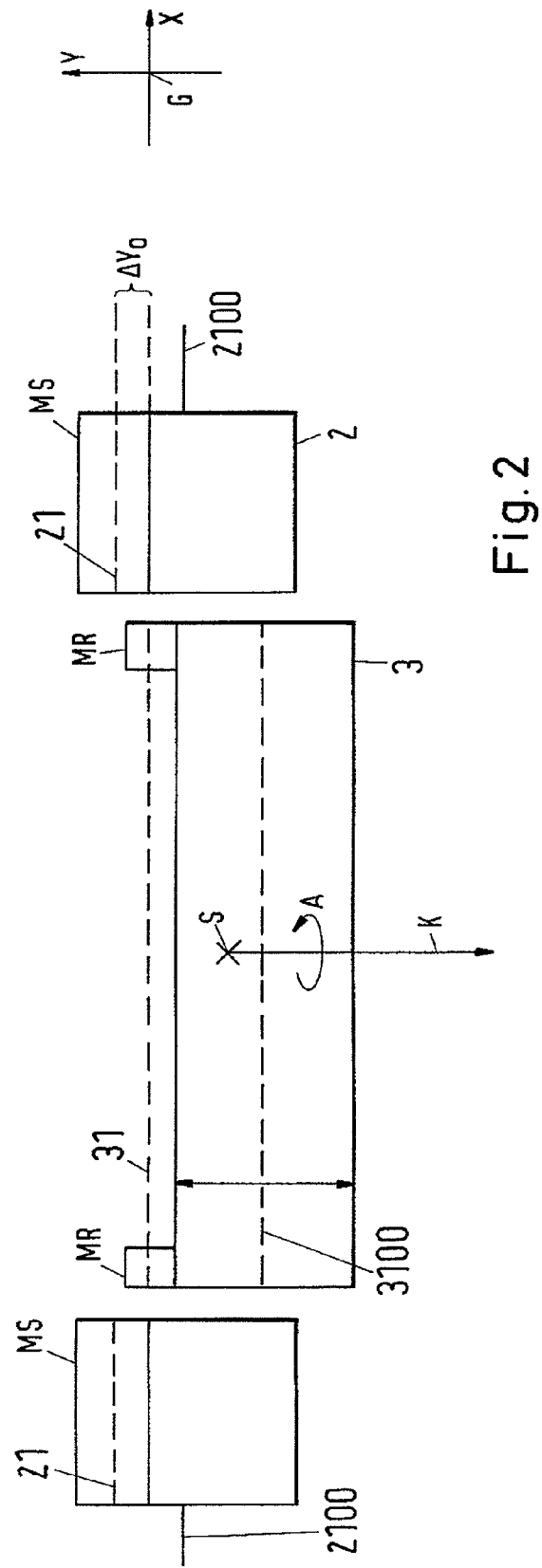

A further embodiment of a rotational machine 1 in accordance with the invention is illustrated schematically in FIG. 2. The windings 22 for the generation of the active magnetic drive and radial support field are not illustrated for reasons of clarity.

In this example the embodiment concerned has a certain significance for practice. As can be seen from FIG. 1, the rotor 3 is in the equilibrium position G in the stator 2. Due to its mass, the heavy rotor 3 is offset in the direction of the weight force K by the offset distance $\Delta Y_0$ downwardly in accordance with the illustration.

Both the rotor 3 and also the stator 2 are not formed from a permanent magnetic material in the embodiment of FIG. 2. For example, the stator 2 is manufactured from a more or less strong ferromagnetic material on which a stator magnet MS is provided for the production of passive reluctance forces, which has the effect that the magnetic stator plane 21 is displaced upwards in accordance with the illustration towards the stator magnet MS in relation to the geometric stator plane 2100. In this respect, in dependence of the embodiment, the stator magnet MS can be polarized, for example, in the radial direction X or in the axial direction Y. In this respect it is naturally understood that in contrast to the simple specific example of FIG. 2, the magnetic stator plane 21 does not necessarily have generally to lie at the geometric center of the stator magnet MS, for example, in dependence on the permeability of the ferromagnetic material of the stator 2.

The rotor 3 is either made from a magnetic material or from a relatively light essentially not magnetic material or only slightly magnetic material, e.g. from aluminum or an aluminum alloy or from brass or another material or is manufactured from a different type of alloy and the rotor magnet MR is arranged on said rotor, interacts via the reluctance forces with the stator magnet MS and stabilizes the rotor 3 in the axial direction against the weight force K in the stator 2. In this respect the rotor magnet MR can in dependence on the embodiment, for example, be polarized in the radial direction X or in the axial direction Y.

In this respect the magnets MR, MS can be formed as ring magnets MR, MS or a plurality of individual rotor magnets MR can be provided at the rotor 3 and/or also a plurality of individual stator magnets MS can also be provided at the stator.

Since the body of the rotor 3 is essentially non-magnetic or only weakly magnetic, in this example the magnetic rotor plane 31 in accordance with the illustration lies above the geometric rotor plane 3100 and is determined primarily by the rotor magnets MR.

In the example of FIG. 2 it is even the case that the rotor magnet MR has a considerable weight in comparison to the body of the rotor 3 so that the center of gravity S of the rotor 3 lies completely above the geometric rotor axis 3100, i.e. outside of the geometric rotor axis 3100. It is understood that the center of gravity can also lie below the geometric rotor axis 3100 e.g. when the body of the rotor 3 is not homogeneously designed and e.g. is manufactured from a heavier material in a lower region than in a upper region.

The essential recognition which one obtains from FIG. 2 is that the magnetic and geometric planes of stator 2 or rotor 3 by no means have to coincide and that the center of gravity S of the rotor can also be outside of the geometric rotor plane 3100, i.e. lie above or below this. This can ultimately result from the fact that the geometric stator plane 2100 and the geometric rotor plane 3100 are ultimately defined via the geometry of the stator 2 and the rotor 3, while the stator plane 21 or the magnet rotor plane 31 is decisive for the geometry of the magnetic interaction forces, i.e. the reluctance forces and/or the active magnetic forces between the stator 2 and the rotor 3 which the person of ordinary skill in the art knows how to construct e.g. in the form of vector diagrams from magnetic force vectors or magnetic field vectors. Moreover, the person of ordinary skill in the art knows that, in particular the planes of the reluctance forces and of the present magnetic forces can coincide, but generally do not always have to coincide.

Figure 3:
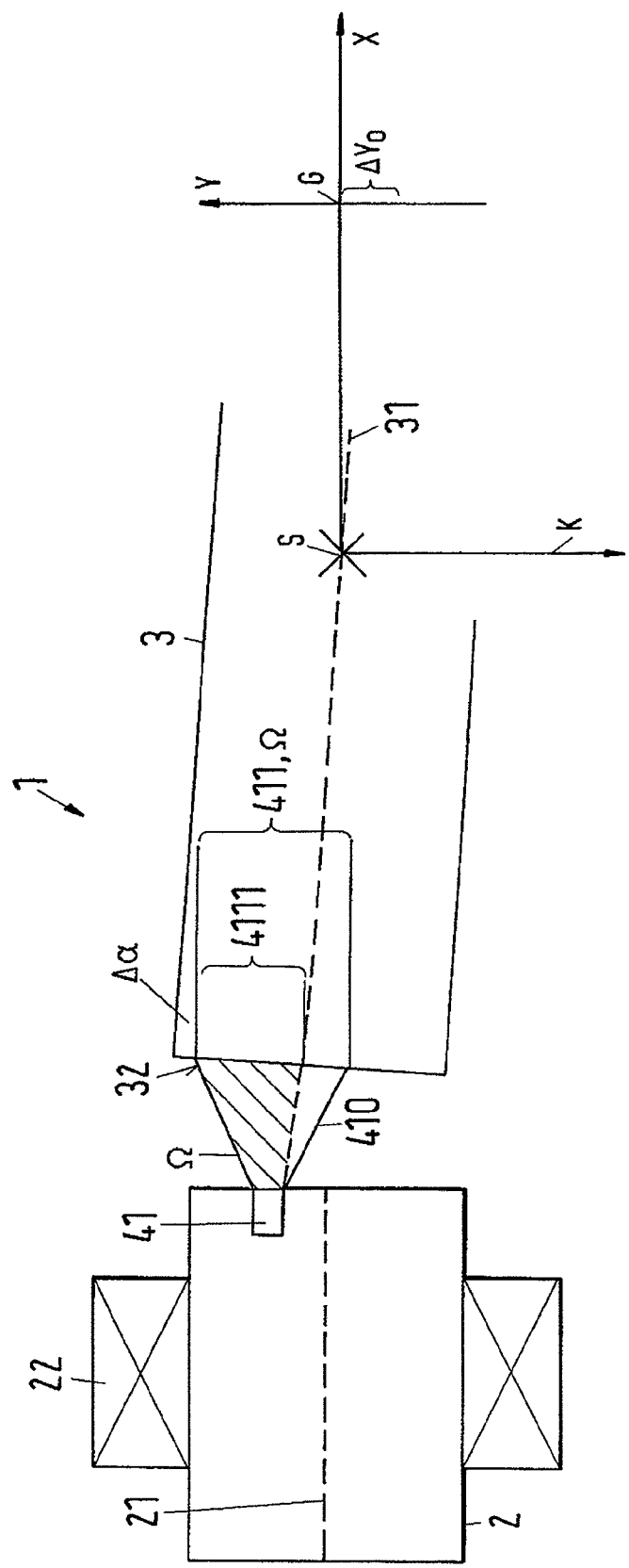
Figure 4:
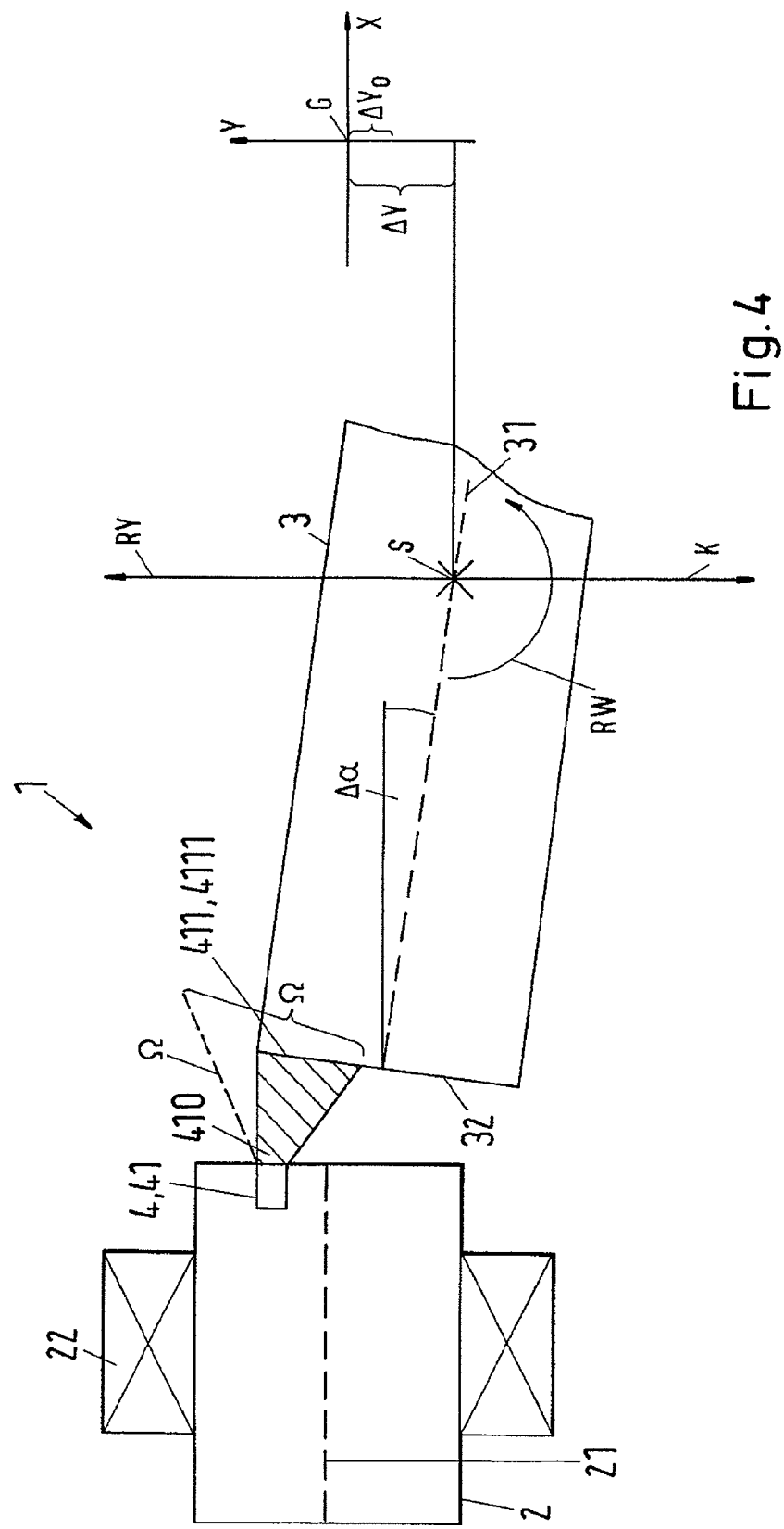

In FIG. 3 and in FIG. 4 the embodiment of FIG. 1 is illustrated in sections in the operational state with a tilting of the rotor.

FIG. 3 and FIG. 4 are particularly suitable for illustrating the definition of the first measurement zone 411 and the first control measurement zone 4111 and/or to illustrate the position of the first measurement zone 411 relative to the associated control measurement zone 4111 from which measurement zone the first sensor 41 receives its first sensor signal 410. The same is naturally true for the second measurement zone 421 and the associated second control measurement zone 4211 of the second sensor 42 which will be discussed in more detail later.

To simplify the following discussion a little the first sensor 41 can be an electromagnetic sensor 41, for example an inductive sensor 41 known per se or an eddy current sensor 41 which receives the first sensor signal 410 from a surface layer of the circumferential surface 32 of the rotor 3.

Naturally, it can also be any other type of sensor, e.g. a sensor 41 which receives a sensor signal 410, for example a sensor signal 410 reflected at the circumferential surface 32, e.g. an optical or an acoustic sensor signal 410 which is transmitted from a signal generator, which can also be the sensor 42 itself, to the circumferential surface and is reflected from this to the sensor 42.

In the first case of an electromagnetic sensor 41 the measurement zone 411 is then a measurement volume, in the second case, in which the sensor signal 410 is a sensor signal 410 reflected from the circumferential surface 32, the measurement zone 411 is a measurement surface.

In the rotational machine 1 in accordance with the invention schematically illustrated in FIG. 3 in the operational state, the tilting $\Delta\alpha$ of the rotor 3 is small and the center of gravity S is displaced upwardly in accordance with the illustration randomly by the offset distance $\Delta Y = \Delta Y_0$ from the equilibrium position G against the direction of the gravitational force K due to interference. In this respect the first sensor 41 is arranged at the stator 2, such that the first measurement zone 411 lies totally at the circumferential surface 32 of the rotor 3. In this respect the offset $\Delta Y_0$ in the axial direction from the equilibrium position G is only a momentary state which will automatically be reversed again due to the reluctance forces in the further course of operation so that the rotor 3 is again stabilized in relation to the axial direction the equilibrium position G.

In this respect the meaning of the first measurement zone 411 in the scope of this application is to be understood such that the measurement zone 411 defines the space region or surface region or more precisely the spatial angular region $\Omega$, from which the sensor is principally able to receive the sensor signal 410 due to its design and its arrangement. A signal which emanates from outside the region $\Omega$ cannot be detected by the sensor 41.

In this respect the geometric boundary of the spatial angular region $\Omega$ is naturally to be understood technically and not mathematically here.

This means that it is in principle naturally possible that the sensor 41 can also receive a minimally small signal from outside of the spatial angular region $\Omega$. However, and this is how the boundary of the spatial angular region $\Omega$ is to be understood, the total strength of a signal which the sensor 41 receives from outside of the spatial angular region $\Omega$ lies below the sensitivity threshold of the sensor 41, so that this at best is detected as noise and not as a evaluatable sensor signal 410.

Thus, in the example of FIG. 3 the sensor 41 receives a sensor signal 410 from the total possible spatial angular region $\Omega$ as the sensor 41 figuratively speaking does not look beyond the boundary of the rotor 3 with the spatial angular region $\Omega$, as would be the case for a strong tilt $\Delta\alpha$ in accordance with FIG. 4. In the example of FIG. 3 the first measurement zone 411 and the spatial angular region $\Omega$ thus cover an identical surface. In the example of FIG. 4, in which the sensor 41 looks above the boundary of the rotor 3, the surfaces or spatial regions covered by the spatial angular region $\Omega$ and the first measurement zone 411 are no longer identical.

The total sensor signal 410 which the sensor 41 receives in total is thus composed of a portion emanating from the control measurement zone 4111 and a rest which admittedly emanates from the measurement zone 411, but not from the control measurement zone 4111.

In accordance with the invention the control measurement zone 4111 in the present case of FIG. 3 is provided above the magnetic rotor plane 31 at the rotor 3, such that significantly more than 50% of the sensor signal 410 generated from the first control measurement zone 4111 emanates from the first measurement zone 411 in the present case.

The example of FIG. 4 is different from that of FIG. 3 in that the tilt $\Delta\alpha$ of the magnetic rotor plane 31 is a little stronger and is offset completely by a distance $\Delta Y$ in addition to the offset $\Delta Y_0$ in the direction of the gravitational force K, which is larger than the offset $\Delta Y_0$ in the equilibrium position G due to interference simultaneously at the center of gravity S of the rotor 3. This has the effect that the sensor 41 looks outside of the boundary of the rotor 3 which means that the spatial angular region Ω and the first measurement zone 411 are no longer identical since a part of the surface covered by the spatial angular region Ω lies outside the circumferential surface 32 of the rotor 3 as can be clearly seen from FIG. 4. In this case the control measurement zone 4111 is identical to the first measurement zone 411 so that even 100% of the signal which can be generated from the measurement zone 411 is generated at the first sensor 41 from the first control measurement zone 4111 and thus the tilting Δα can be stabilized in accordance with the invention.

In this respect the offset ΔY in the axial direction from the equilibrium position G is only a momentary state which is primarily automatically reversed again by the reluctance forces in the further operation, so that the rotor 3 is stabilized back in the equilibrium position again with respect to the axial direction.

In FIG. 5a to FIG. 8b the definition of the first measurement zone 411 and of the first sensor signal 410 which can be generated from the first measurement zone as well as the first control measurement zone 4111 should be described in somewhat more detail in the sense of this application. Furthermore, the interrelationship of the measurement zones 411, 4111 with the spatial angular region Ω, which, figuratively speaking, symbolizes the viewing field of the sensor, i.e. the region from which the sensor 41 is principally in the position to receive the sensor signal 410 due to its construction and its arrangement is shown. Furthermore, the requirement that at least 50% of the first sensor signal 410 which can be generated from the first measurement zone 411 must be generated by the first control measurement zone 4111 at the first sensor 41 is additionally schematically illustrated by the intensity distribution.

It is self-explanatory that these explanations which are representatively given in relation to the measurement situation relating to the first sensor 41 naturally also apply completely analogously to the second sensor 42 and every other sensor potentially provided at the rotational machine 1 with the associated measurement zones and regions.

The integral common, i.e. the sum of the total measurement signal from the related measurement zone, is to be understood when the term of the intensity of a sensor signal is used in the following.

In FIG. 5a to FIG. 8b respectively a section of a part of the stator 2 and of the rotor 3 of a rotational machine 1 in accordance with the invention is schematically shown. The rotor 3 is respectively displaced downwardly in accordance with the illustration by the offset distance $\Delta Y_0$ in direction of the gravitational force with relation to the magnetic stator plane 21. Apart from the example shown in FIG. 5a and FIG. 5b the magnetic rotor axis 31 of the rotor 3 is tilted by a more or less strong tilting Δα against the magnetic stator axis 21. The sensor 41 is only arranged by way of example in accordance with the illustration above the magnetic stator plane 21 and could naturally also be arranged below the magnetic stator plane 21 or, e.g. when the sensor 41 is correspondingly tilted and/or has a sufficiently large viewing field, even on the magnetic stator plane 21.

In the most favourable case, in this respect the sensor 41 can take up a maximum intensity $I_{max}$ of the sensor signal 410 which can be generated at the rotor 3 due to its construction, the arrangement at the stator 2 and the distance between the stator 2 and the rotor 3.

In accordance with FIG. 5 the rotor 3 is in its equilibrium position G, i.e. it is displaced by its offset distance $\Delta Y_0$ with regard to the magnetic stator plane 21 and not tilted. The sensor 41 is arranged at the stator 2 such that the total spatial angular region Ω, i.e. the region from which the sensor 41 could actually receive a measurable signal only covers a region of the circumferential surface 32 of the rotor 3 and not a region above or below the rotor 3. I.e. the sensor 41 does not view beyond the boundary of the rotor 3.

In the FIGS. 5b, 6b, 7b and 8b, respectively an intensity diagram is shown in which the intensity I of the sensor signal 410 is applied onto the ordinate axis in which the sensor 41 receives in the respectively associated example of FIGS. 5a, 6a, 7a, 8a from a region, which is applied on the abscissa axis. This means the height of the line that is e.g. applied above the coordinate 411 indicates the percentage portion of the maximum intensity $I_{max}$ which the sensor receives from the first measurement zone 411 in the associated example of the Figure shown above it. The same is true for the coordinates Ω, 4111 and [411-4111] which are also applied to the abscissa axis.

Also shown at the ordinate axis is the boundary intensity of 50% of the first sensor signal 410 which can be generated from the first measurement zone 411 which is referred to in the diagram at the ordinate axis with 50% $I_{411}$.

Figure 5A:
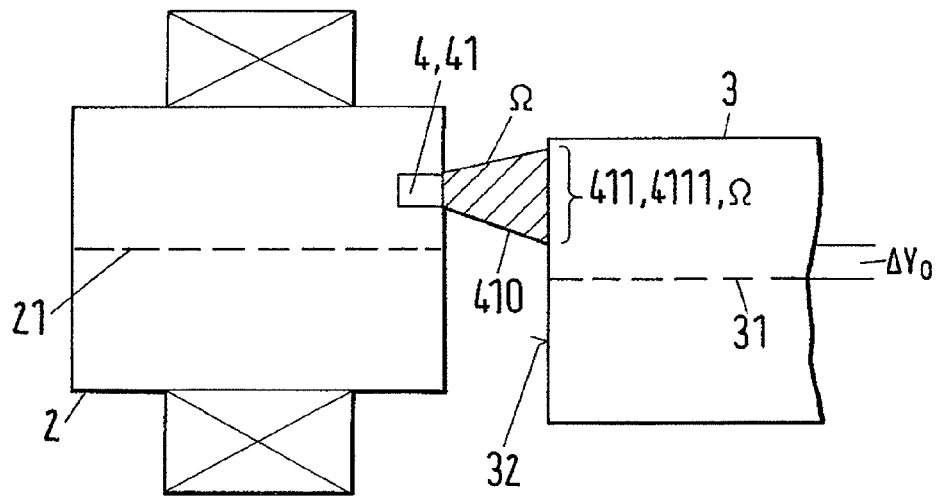

In the case of FIG. 5a the surface covered by the spatial angular region Ω is identical to the first measurement zone 411 and this in turn is identical to the first control measurement zone 4111.

Figure 5B:
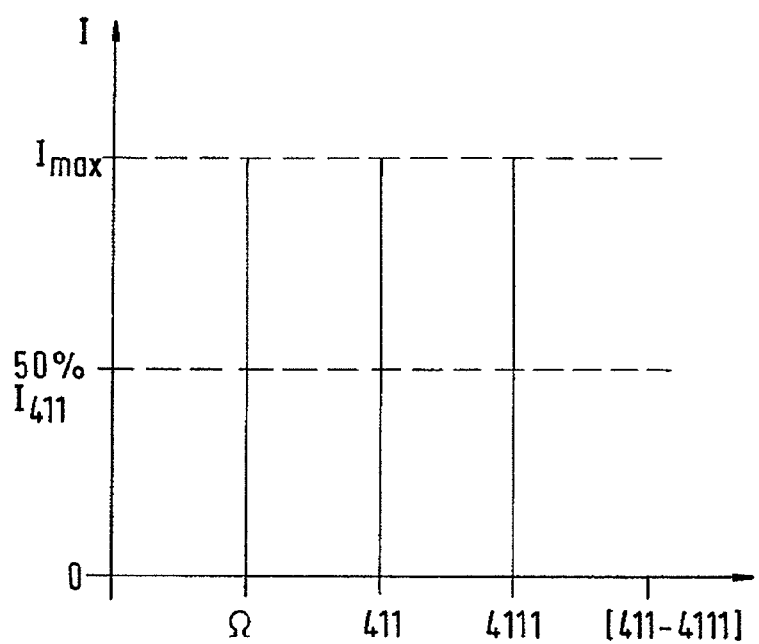

Thus, as can be seen from FIG. 5b, the maximum intensity $I_{max}$ of the sensor signal 410 which can be generated at the rotor 3 is identical to the actually generated intensity from the first measurement zone 411. Thus, since the first measurement zone 411 is identical to the first control measurement zone 4111, the intensity from the first control measurement zone is also equal to the maximum intensity $I_{max}$ which can be generated at a maximum at the rotor 3. Thus, the difference intensity [411-4111] is equal to zero.

In this case, in a trivial aspect, the requirement that at least 50% of the first sensor signal which can be generated from the first measurement zone 411 is generated by the first control measurement zone 4111 at the first sensor 41 is satisfied, since in the present case actually 100% of the first sensor signal 411 which can be generated from the first measurement zone 410 is generated by the first control measurement zone 4111 at the first sensor 41.

Figure 6A:
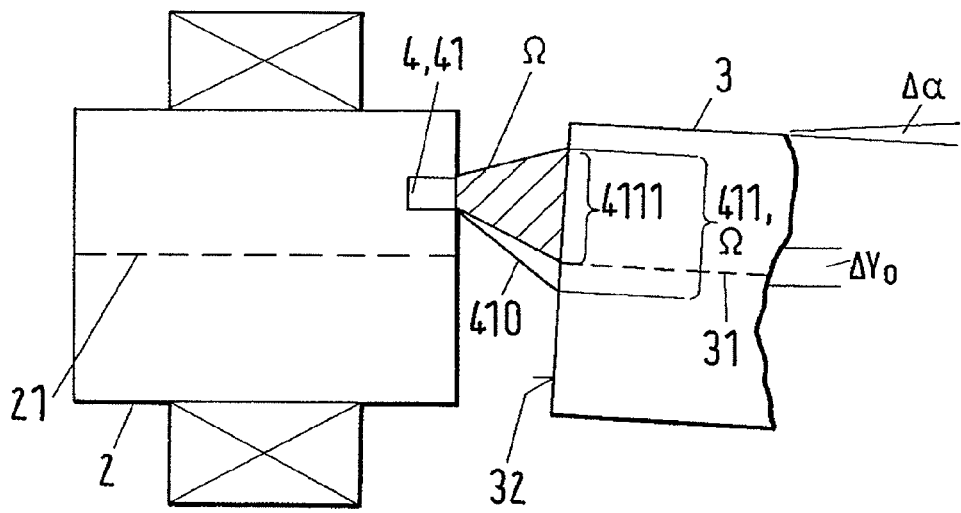

The rotor 3 in accordance with FIG. 6a is admittedly in its equilibrium position in relation to its axial position, i.e. it is offset by the offset distance $\Delta Y_0$ in relation to the magnetic stator plane 21, however, it is tilted by the tilt Δα against the magnetic stator plane 21. The sensor 41 is also arranged at the stator 2 such that the total spatial angular region Ω, i.e. the region from which the sensor 41 can actually receive a measurable signal, only covers a region on the circumferential surface 32 of the rotor 3 and not a region above or below the rotor 3. This means that the sensor 41 does not view beyond the boundary of the rotor 3.

Also in the case of FIG. 6a the surface covered by the spatial angular region Ω is identical to the first measurement zone 411. However, the first measurement zone 411 is not identical to the first control measurement zone 4111, as the control measurement zone 4111 only reaches up to the magnetic rotor axis 31 while the first measurement zone admittedly lies for the most part above the magnetic rotor axis 31, but also with a small part below.

Figure 6B:
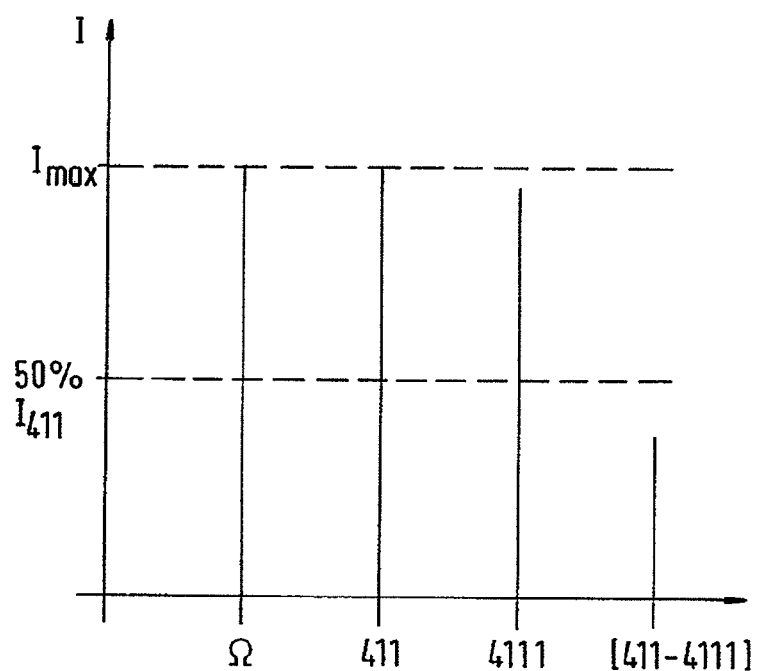

Correspondingly the intensity diagram of FIG. 6b is different from that in FIG. 5b. Since the sensor 41 does not view beyond the boundary of the rotor 3, the sensor receives the maximum signal intensity $I_{max}$ which can be generated from the spatial angular region Ω and/or from the first measurement zone 411. Since the first control measurement 4111 is smaller than the first measurement zone 411, a signal intensity is generated from the first control measurement zone at the sensor 41 which is admittedly even larger than 50% of the sensor signal 410 which is generated in the first measurement zone 411, but is smaller than the sensor signal 410, as can be seen from FIG. 6b. Correspondingly the difference intensity also does not disappear from the region [411-4111].

Figure 7A:
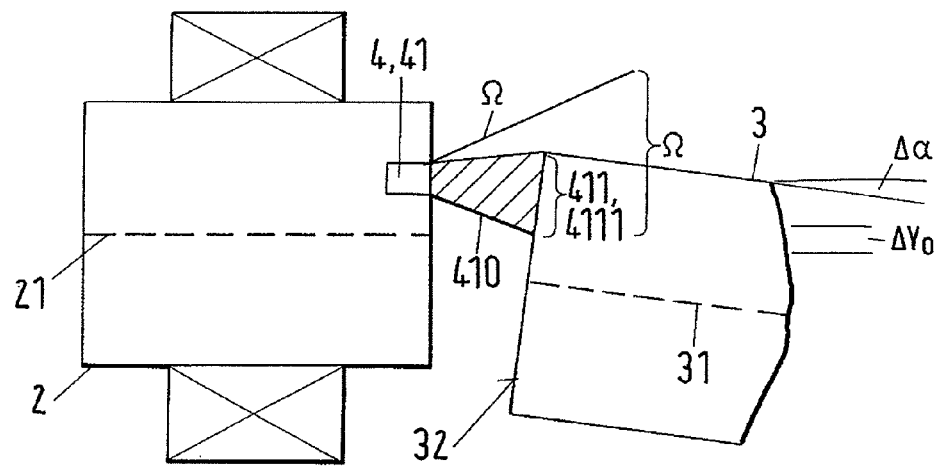
Figure 8A:
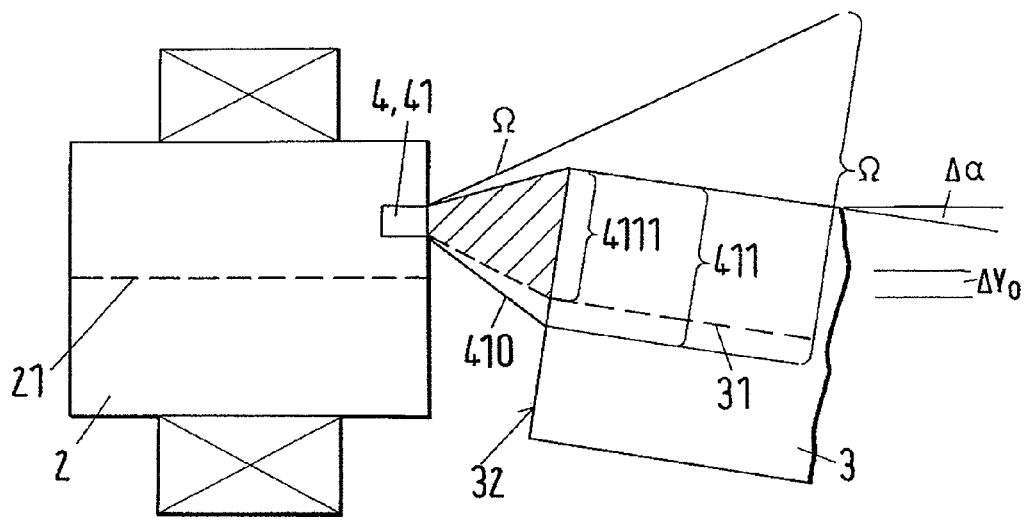

In the examples of FIGS. 7a and 8a, the sensor 41 partially looks above the upper boundary of the rotor 3 in accordance with the illustration.

In the example of FIG. 7a the first measurement zone 411 lies completely above the magnetic rotor plane 31 of the rotor 3 and the measurement zone 411 is accordingly identical with the control measurement zone 4111. Since the sensor 41 now looks above the rotor boundary, i.e. the surface covered by the spatial angular region Ω no longer lies completely on the circumferential surface 32 of the rotor 3, the signal intensity I received from the spatial angular region Ω at the sensor 41 is smaller than the maximum possible signal intensity $I_{max}$. And since the surfaces formed by the first measurement zone 411 and the first control measurement zone 4111 are identical, also the intensities correspondingly measured by the sensor 41 are also identical, as can be seen from FIG. 7b and thus, the difference intensity [411-4111] is also identically zero. In this respect in the present example, the region covered by the spatial angle Ω is larger than the first measurement zone 411 and the first control measurement zone 4111, wherein, however, the intensity which is registered by the sensor 41 from the spatial angle Ω is identical to the intensity from the first measurement zone 411 and from the first control measurement zone 4111.

A more complicated signal distribution results in the sensor arrangement in accordance with FIG. 8a.

Here the first measurement zone 411 no longer lies completely above the magnetic rotor plane 31 of the rotor 3 and the measurement zone 411 is accordingly also not identical to the control measurement zone 4111. Additionally, the sensor now also views above the rotor boundary, i.e. the surface covered by the spatial angular region Ω no longer lies completely on the circumferential area 32 of the rotor 3. Thus, the signal intensity I received at the sensor from the spatial angular region Ω is smaller than the maximum possible signal intensity $I_{max}$. The intensity which can be generated at the sensor from the first measurement zone 411 is consequently also smaller than the maximum intensity $I_{max}$ which can be generated and equal to the intensity from the spatial angular region Ω as both cover the same surfaces of the rotor 3. The intensity generated from the first control measurement zone 4111 is smaller than the intensity generated from the first measurement zone 411, as the first control measurement zone 4111 is completely above the magnetic rotor plane 31, while the first measurement 411 is also partially below this. Thus, the difference intensity [411-4111] is also no longer identically zero.

In a preferred embodiment of a rotational machine in accordance with the invention a tilting of the rotor brings about a damping force on a tilting movement of rotor via a differentiating part of a radial position regulator.

In this respect in an embodiment very important for practice more than 50% of a sensor signal which can be generated from the first measurement zone can be generated by the first control measurement zone at the first sensor.

Particularly preferably for the determination of a tilting of the rotor with respect to the magnetic stator plane, a second control measurement zone, which is a part of the second measurement zone, is provided below or above the magnetic rotor plane at the rotor such that at least 50% preferably more than 50% of the second sensor signal which can be generated from the second measurement zone can be generated by the second control measurement zone at the second sensor.

In this respect it must be noted that the case in which in a technical sense exactly 50% of the first sensor signal and/or of the second sensor signal which can be generated from the first measurement zone and/or from the second measurement zone can be generated at the first and/or at the second sensor by the first and/or the second control measurement zone is only covered by the present invention in the case that the spatial angular region from which the sensor can receive a signal is so large that the sensor simultaneously looks above the boundary and also below the boundary of the rotor. All other cases in which, in a technical sense, exactly 50% of the signal which can be generated from the measurement zones can be correspondingly generated at the sensor by the corresponding control measurement zone can lead to a destabilization of the sensor with regard to a tilting and thus, are also not covered by the present invention.

I.e. in most cases relevant for practice more than 50% of the signal which can be generated from the measurement zone are generated at the sensor by the associated control measurement zone. The exceptional case mentioned in the last section is only relevant to very large sensors which simultaneously cover above and below the boundary of the rotor.

In dependence on the type of the sensor used, the first measurement zone and/or the second measurement zone can be e.g. a measurement volume or also a measurement area, e.g. in a sensor which is based on the reflection principle.

Preferably the first control measurement zone and/or the second control measurement zone is arranged below the magnetic rotor plane so that at least 55%, preferably 70%, in particular at least 90% and particularly preferably at least 95% of the first sensor signal which can be generated from the first measurement zone can be generated by the first control measurement zone and/or so that at least 55%, preferably at least 70%, in particular at least 90% and particularly preferably at least 95% of the second sensor signal which can be generated from the second measurement zone can be generated by the second control measurement zone.

In another embodiment in accordance with the invention at least 95%, preferably at least 97%, in particular more than 99% of a first maximum signal intensity can be generated by the first measurement zone and/or at least 95%, preferably at least 97%, in particular more than 99% of the second maximum signal intensity can be generated by the second measurement zone. This means that in this example at most 5% of the spatial angular region, i.e. of the viewing field of the sensor, lies below the rotor boundary.

In another embodiment in accordance with the invention the first measurement zone and/or the second measurement zone is arranged above the magnetic rotor plane so that at most 99%, preferably at most 95%, in particular at most 75%, amongst others at most 30% of the first maximum signal intensity and/or of the second maximum signal intensity ($I_{max}$) can be generated by the first measurement zone and/or by the second measurement zone. This means that in this embodiment, in which the first measurement zone and/or the second measurement zone is essentially arranged above the magnetic rotor plane, for a stable running of the rotor with respect to a tilting in it is primarily actually not necessarily dependent on how much of the control measurement zone is available in comparison to the measurement zone, but it is essential that the sensor views beyond the rotor boundary.

In practice frequently more than two sensors are used. Thus, the sensor unit of the present invention can include at least three sensors for determining the deflection of the rotor from the equilibrium position; in particular at least four sensors can be provided, and especially six, eight or more sensors can be provided, wherein two respective sensors preferably form a pair of sensors which provide a summed signal or a difference signal.

As already mentioned, the first sensor and/or the second sensor can be a volume sensor, in particular an electromagnetic or magnetic sensor, especially an inductive sensor, a capacitive sensor or an eddy current sensor, and/or an optical sensor and/or an acoustic sensor and/or a different suitable sensor for the determination of the deflection of the rotor from the equilibrium position.

As already mentioned in the operational state the magnetic rotor plane of a rotational machine in accordance with the invention is displaced by an offset distance in the axial direction with respect to the magnetic stator plane due to the mass of the rotor. In this respect the offset distance is at most 40% or at most 30% of the axial height of the rotor, in particular between 0.1% and 20% of the axial height of the rotor, especially between 1% and 10%, particularly preferably 3% to 5% of the axial height of the rotor.

For the evaluation of the sensor signals and for the control and/or regulation of the equilibrium position of the rotor, an actuator unit including an electronic data processing unit can be provided in a manner known per se.

The invention further relates to a method for determining a tilting of a rotor of a rotational machine which rotational machine is adapted as a bearing-free engine including a stator designed as a bearing and drive stator having a magnetic stator plane, wherein the magnetic rotor having a magnetic rotor plane is supported magnetically in contact free manner within the stator in the operational state. In this respect an axial height of the rotor is selected smaller than or equal to a half diameter of the rotor and the rotor is stabilized passively by reluctance forces with respect to the magnetic stator plane both against an axial displacement and also against a tilting from an equilibrium position. A sensor unit having a first sensor and a second sensor is provided at the stator and, for the determination of a deflection of the rotor from the equilibrium position, a first sensor signal from a first measurement zone of the rotor is evaluated by means of the first sensor and a second sensor signal from a second measurement zone of the rotor is evaluated by means of the second sensor. In accordance with the invention for the determination of the tilting of the rotor relative to the magnetic stator plane a first control measurement zone which is part of the first measurement zone is provided either below or above the magnetic rotor plane at the rotor such that at least 50% of the first sensor signal generated from the first measurement zone is generated by the first control measurement zone at the first sensor.

In the method in accordance with the invention the tilting of the rotor is preferably reversed via a differentiating portion of a radial position regulator due to a damping force acting on the tilting movement of the rotor.

In practice usually more than 50% of the first sensor signal generated from a first measurement zone is generated by the first control measurement zone at the first sensor.

In a particularly preferred embodiment, for the determination of the tilting of the rotor with respect to the magnetic stator plane a second control measurement zone which is part of the second measurement zone is provided below or above the magnetic rotor plane at the rotor such that at least 50%, preferably more than 50% of the second sensor signal generated from the second measurement zone is generated by the second control measurement zone at the second sensor.

In this respect the first measurement zone and/or the second measurement zone can be a measurement volume and/or the first measurement zone and/or the second measurement zone can also be a measurement area in a different embodiment.

In a specific embodiment of the method in accordance with the invention the first control measurement zone is provided below the magnetic rotor plane so that at least 55%, preferably at least 70%, in particular at least 90%, particularly preferably at least 95% of the first sensor signal generated from the first measurement zone is generated by the first control measurement zone and/or the second measurement zone is provided below the magnetic rotor plane so that at least 55%, preferably at least 70%, in particular at least 90%, and particularly preferably at least 95% of the second sensor signal generated from the second measurement zone is generated by the second control measurement zone.

In another embodiment important for practice at least 95%, preferably at least 97%, in particular more than 99% of a first maximum signal intensity $I_{max}$ is generated by the first measurement zone and/or at least 95%, preferably at least 97%, in particular more than 99% of a second maximum signal intensity $I_{max}$ is generated by the second measurement zone. Expressed in a simple way, this means that at most 5% of the spatial angle, i.e. at most 5% of the viewing field of the sensor, lies below the rotor boundary.

In another embodiment also very important for practice the first measurement zone and/or the second measurement zone is arranged above the magnetic rotor plane so that at most 99%, preferably at most 95%, in particular at most 75% amongst others at most 30% of the first maximum signal intensity $I_{max}$ and/or of the second maximum signal intensity $I_{max}$ is generated by the first measurement zone and/or by the second measurement zone. This means, in the case that the measurement zone essentially lies above the magnetic rotor plane it is not necessarily dependent on how large the area of the control measurement zone is. It is rather important that a part of the spatial region, i.e. of the viewing field of the sensor, lies above the rotor boundary, i.e. that the sensor views beyond the rotor boundary.

For carrying out the method in accordance with the invention in practice at least three sensors are provided for determining the deflection of the rotor from the equilibrium position, in particular at least four sensors are provided, and especially at least six, eight or more sensors are provided.

Preferably a sum of the first sensor signal of the first sensor and of the second sensor signal of the second sensor is evaluated and/or a difference between the first sensor signal at the first sensor and the second signal of the second sensor is evaluated.

Particular preferably the first sensor and/or the second sensor is a volume sensor, in particular an electromagnetic or magnetic sensor, especially an inductive sensor, a capacitive sensor or an eddy current sensor and/or an optical sensor and/or an acoustic sensor and/or a different suitable sensor for the determination of the deflection of the rotor from the equilibrium position.

As already mentioned several times, in the operational state the magnetic rotor plane is displaced by an offset distance in axial direction with respect to the magnetic stator plane due to the mass of the rotor, wherein the offset distance is set to at most 40% or at most 30% of the axial height of the rotor, in particular between 0.1% and 20% of the axial height of the rotor, especially between 1% and 10% particularly preferably between 3% and 5% of the axial height of the rotor.

To evaluate the sensor signals and for the control and/or regulation of the equilibrium position of the rotor an actuator unit including an electronic data processing unit is provided in a manner known per se.

In dependence on the specific application a damping force can be electrically, magnetically, mechanically, hydraulically or pneumatically effected onto the tilting movement of the rotor, as for example, inter alia, is the case for known rotational machines which are operated as pumps in a medium having a predetermined viscosity.

The invention further relates to a processing plant, in particular a wafer processing plant, a biological reactor plant, pump, mixer or any other processing plants having a rotational machine in accordance with the present invention which is operated in accordance with the method of the invention.

Figure 7B:
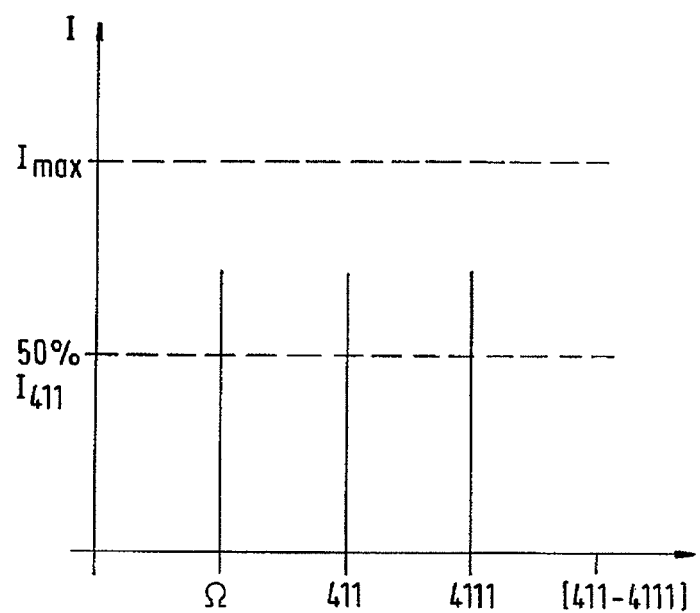
Figure 8B:
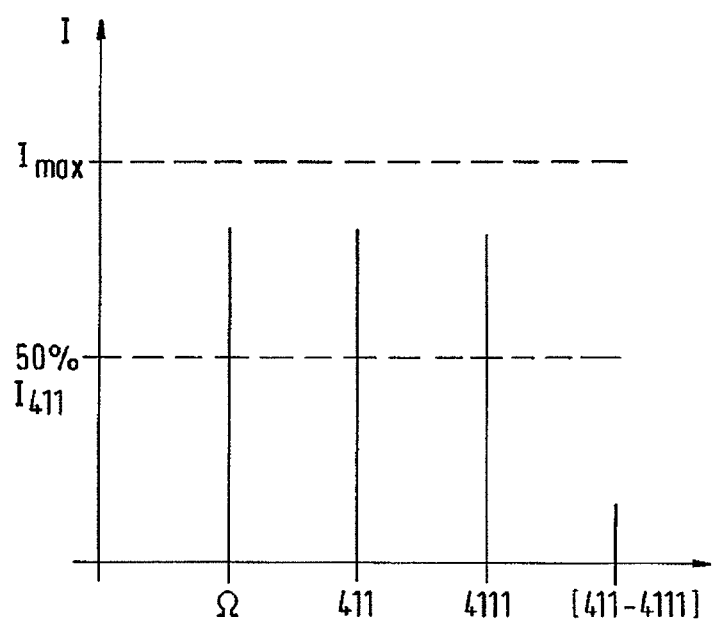
Figure 9A:
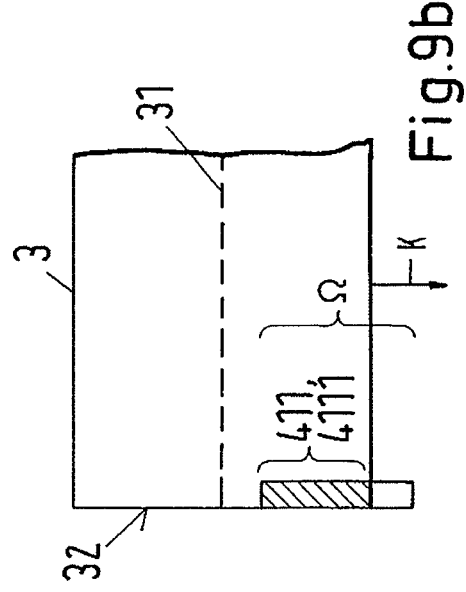
Figure 9B:
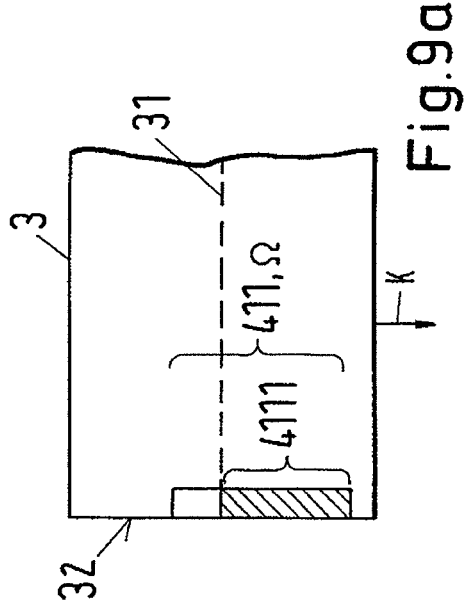
Figure 9C:
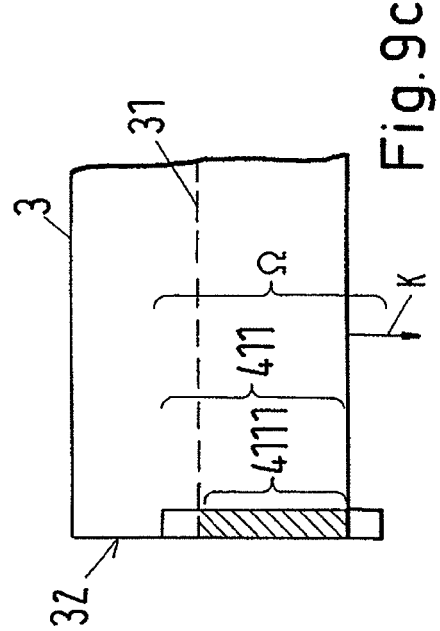
Figure 10A:
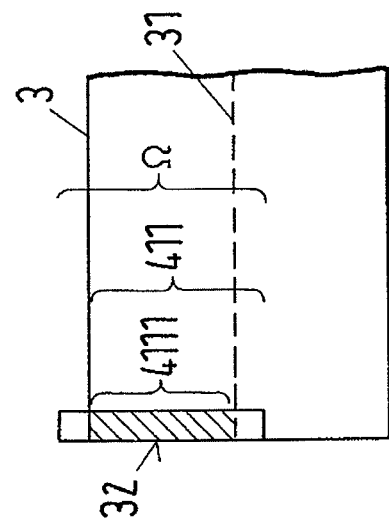
Figure 10B:
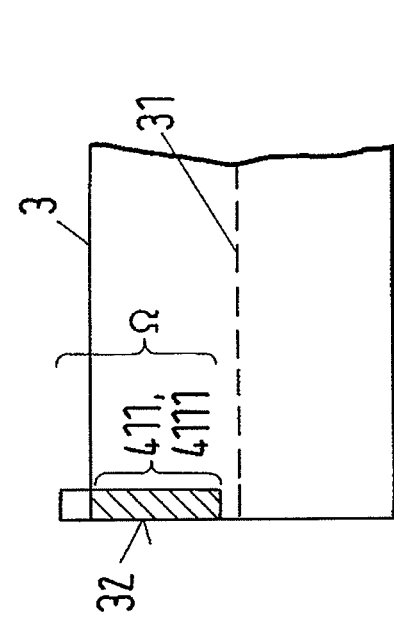
Figure 11:
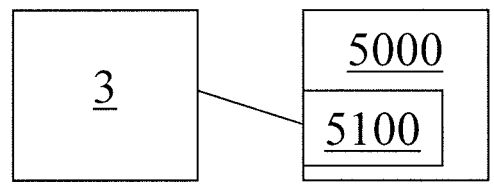

In the following the invention will be described with reference to embodiments with the aid of the drawings both as an apparatus and also with respect to the technical method. The schematic drawing respectively shows in section:

FIG. 1 a rotational machine in accordance with the invention having a rotor in the equilibrium position;

FIG. 2 a second embodiment in accordance with FIG. 1 with a stator magnet and a rotor magnet;

FIG. 3 the embodiment of FIG. 1 in the operational state with a small tilt of the rotor;

FIG. 4 the embodiment of FIG. 1 in the operational state with a large tilt of the rotor;

FIG. 5a a first operational state of a rotational machine in accordance with the invention;

FIG. 5b an intensity distribution for the operational state of FIG. 5a;

FIG. 6a a second operational state of a rotational machine in accordance with the invention;

FIG. 6b an intensity distribution for the operational state of FIG. 6a;

FIG. 7a a third operational state of a rotational machine in accordance with the invention;

FIG. 7b an intensity distribution for the operational state of FIG. 7a;

FIG. 8a a fourth operational state of a rotational machine in accordance with the invention;

FIG. 8b an intensity distribution for the operational state of FIG. 8a;

FIG. 9a a first embodiment in accordance with the invention with a control measurement zone below the magnetic rotor plane;

FIG. 9b a second embodiment in accordance with FIG. 9a;

FIG. 9c a third embodiment in accordance with FIG. 9a;

FIG. 10a a first embodiment in accordance with the invention having a control measurement zone above the magnetic rotor plane;

FIG. 10b a second embodiment in accordance with FIG. 10a;

FIG. 11 a rotor and associated radial position regulator

Figure 12:
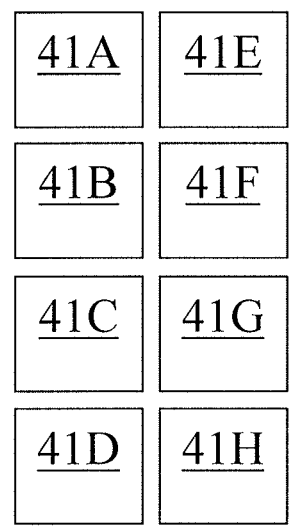

FIG. 12 eight sensors

Figure 13:
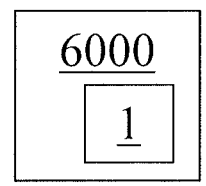

FIG. 13 a processing plant having a rotational machine

FIG. 1 to FIG. 8b have already been described above in detail so that at this point the discussion will continue with the description of FIG. 9a to FIG. 10b.

FIG. 9a to FIG. 10b for clarification show some few special embodiments of the invention which lead to stabilization of a tilting movement of the rotor in the operational state. For reasons of clarity the illustration of the stator 2 and the sensor 41 was omitted. In particular because, as already mentioned in detail, the position of the sensor is basically secondary, since it essentially depends on the position of the spatial angular region Ω on the measurement zone 411 and the control measurement zone 4111.

In this respect in FIGS. 9a to 10b the spatial angular region Ω, i.e. the viewing field of the sensor, is characterized by a small rectangle bounding at the circumferential surface 32 of the rotor 3, wherein the control measurement zone 4111 is respectively shaded.

In this respect FIGS. 9a to 9c exemplarily show an embodiment in which the control measurement zone lies below the magnetic rotor plane in accordance with the illustration, while FIGS. 10a and 10b respectively show an example in which the control measurement zone lies above the magnetic rotor plane 31. The terms above and below are in this respect viewed in the typical sense in relation to the gravitational force K whose direction is also indicated with the arrow marked with K.

In the embodiment of FIG. 9a in accordance with the invention the viewing field of the sensor 41, i.e. the spatial angular region Ω lies completely on the circumferential surface 32 of the rotor 3, wherein the measurement zone 411 and the control measurement zone 4111 which are identical here lie below the magnetic rotor plane. Advantageously, the sensor 41 receives at least 55% of the maximal signal intensity $I_{max}$ from the control measurement zone 4111 in this case.

The arrangement in accordance with FIG. 9b also leads to a stabilization with respect to tilting in the operational state. Here the spatial angular region Ω lies completely below the magnetic rotor plane, wherein the measurement zone 411 and the control measurement zone 4111 are also identical, the sensor 41, however, looks a little below the rotor 3. In the example of FIG. 9b the sensor 41 preferably receives at least 95% of the maximum signal intensity $I_{max}$ from the control measurement zone 4111.

In the embodiment in accordance with FIG. 9c the spatial angular region Ω extends from above the magnetic rotor axis 31 below the total lower region of the circumferential surface 32 up to below the rotor edge. The sensor 41 thus also views somewhat below the rotor here. In this embodiment the sensor 41 also preferably receives at least 95% of the maximum signal intensity $I_{max}$ from the control measurement zone 4111.

The arrangement in accordance with FIG. 10a also leads to a stabilization with regard to tilting in the operation state. The spatial angular region Ω here lies completely above the magnetic rotor plane, wherein the measurement zone 411 and the control measurement zone 4111 in turn are identical; however, the sensor 41 covers a little above the rotor 3. In the example of FIG. 10a the sensor 41 preferably receives at most 95% of the maximum signal intensity $I_{max}$ from the measurement zone 411.

In the embodiment in accordance with FIG. 10b the spatial angular region Ω extends from below the magnetic rotor axis 31 above the total upper region of the circumferential surface 32 up to above the rotor edge. Thus, the sensor 41 is also exposed somewhat above the rotor. In this embodiment the sensor 41 also preferably receives 95% of the maximum signal intensity $I_{max}$ from the measurement zone 411.

It is important and interesting to note that the behavior of the regulator is different depending on whether situation this can be in accordance with FIG. 9c or in accordance with FIG. 10b. It is common to both cases that the measurement zone 411 lies partly above and partly below the magnetic rotor plane 31, wherein the spatial angular region Ω, however, does not completely lie on the circumferential surface 32, but the sensor 41 is additionally also views either above the rotor edge or below the rotor edge.

From a purely geometric point of view the examples of FIGS. 9c and 10b appear to be identical to one another in that FIG. 9c is essentially transferred into the FIG. 10b by reflection at the magnetic rotor axis 31 and/or by vice versa.

However, functionally the embodiments of FIGS. 9c and 10b are significantly different to one another.

While the sensor preferably receives at least 95% of the maximum signal intensity $I_{max}$ from the control measurement zone 4111, i.e. is only allowed to cover a little below the rotor, to achieve the stabilization of a tilting movement in the example of the arrangement in accordance with FIG. 9c, in the arrangement in accordance with FIG. 10b this is exactly the opposite. In this case the sensor 41 receives at most 95% of the maximum signal intensity $I_{max}$ from the measurement zone 411, this means the rotor also still runs in a stable manner when the sensor covers very far below the rotor boundary.

Referring to FIG. 11, in a preferred embodiment of a rotational machine 1 in accordance with the invention a tilting of the rotor 3 brings about a damping force on a tilting movement of rotor 3 via a differentiating part 5100 of a radial position regulator 5000.

Referring to FIG. 12, in practice frequently more than two sensors are used. Thus, the sensor unit 4 of the present invention can include at least three sensors 41A-41C for determining the deflection of the rotor from the equilibrium position; in particular at least four sensors 41A-41D can be provided, and especially six, eight or more sensors 41A-41H can be provided, wherein two respective sensors preferably form a pair of sensors which provide a summed signal or a difference signal.

Referring to FIG. 13, the invention further relates to a processing plant 6000, in particular a wafer processing plant, a biological reactor plant, pump, mixer or any other processing plants having a rotational machine 1 in accordance with the present invention which is operated in accordance with the method of the invention.

It is naturally understood that the examples in FIGS. 9a to 10b are not exclusive but are merely to be understood as exemplary for further embodiments covered by the invention.

The invention claimed is:

1. A rotational machine adapted as a bearing-free engine including a stator designed as a bearing and drive stator having a magnetic stator plane and a magnetic rotor having a magnetic rotor plane and supported magnetically in contact free manner within the stator, wherein an axial height of the rotor is smaller than or equal to a half diameter of the rotor and the rotor is stabilized passively by reluctance forces with respect to the magnetic stator plane both against an axial displacement and also against a tilting from an equilibrium position and a sensor unit having a first sensor and a second sensor is provided at the stator such that for the determination of a deflection of the rotor from the equilibrium position a first sensor signal from a first measurement zone of the rotor can be evaluated by means of the first sensor and a second sensor signal from a second measurement zone can be evaluated by means of the second sensor, characterized in that for the determination of the tilting of the rotor relative to the magnetic stator plane a first control measurement zone which is part of the first measurement zone is provided either below or above the magnetic rotor plane at the rotor such that at least 50% of the first sensor signal which can be generated from the first measurement zone can be generated by the first control measurement zone at the first sensor, wherein the tilting of the rotor brings about a damping force on a tilting movement of the rotor via a differentiating portion of a radial position regulator.

2. A rotational machine in accordance with claim 1, wherein more than 50% of the first sensor signal which is generated from the first measurement zone is generated by the first control measurement zone at the first sensor.

3. A rotational machine in accordance with claim 1, wherein for the determination of the tilting of the rotor with respect to the magnetic stator plane, a second control measurement zone which is a part of the second measurement zone is provided below or above the magnetic rotor plane of the rotor at the rotor such that at least 50%, preferably more than 50% of the second sensor signal which can be generated from the second measurement zone, can be generated by the second control measurement zone at the second sensor.

4. A rotational machine in accordance with claim 1, wherein the first measurement zone and/or the second measurement zone is a measurement volume.

5. A rotational machine in accordance with claim 1, wherein the first measurement zone and/or the second measurement zone is a measurement area.

6. A rotational machine in accordance with claim 1, wherein the first control measurement zone and/or the second control measurement zone is arranged below the magnetic stator plane so that at least 55%, preferably at least 70%, in particular at least 90% and particularly preferably at least 95% of the first sensor signal which can be generated from the first measurement zone can be generated by the first control measurement zone and/or that at least 55%, preferably at least 70%, in particular at least 90% and particularly preferably at least 95% of the second sensor signal which can be generated from the second measurement zone can be generated by the second control measurement zone.

7. A rotational machine in accordance with claim 6, wherein at least 95%, preferably at least 97%, in particular more than 99% of a first maximum signal intensity can be generated by the first measurement zone and/or wherein at least 95%, preferably at least 97%, in particular more than 99% of a second maximum signal intensity can be generated by the second measurement zone.

8. A rotational machine in accordance with claim 1, wherein the first measurement zone and/or the second measurement zone is arranged above the magnetic rotor plane so that at most 99%, preferably at most 95% in particular at most 75%, amongst others at most 30% of the first maximum signal intensity and/or of the second maximum signal intensity can be generated by the first measurement zone and/or by the second measurement zone.

9. A rotational machine in accordance with claim 1, wherein the sensor unit includes at least three sensors for determining the deflection of the rotor from the equilibrium position.

10. A rotational machine in accordance with claim 1, wherein two sensors form a respective pair of sensors which provide a summed signal or a difference signal.

11. A rotational machine in accordance with claim 1, wherein the first sensor and/or the second sensor is a volume sensor, in particular an electromagnetic or magnetic sensor, especially an inductive sensor, a capacitive sensor or an eddy current sensor, and/or an optical sensor and/or an acoustic sensor and/or a different suitable sensor for the determination of the deflection of the rotor from the equilibrium position.

12. A rotational machine in accordance with claim 1, wherein in the operational state the magnetic rotor plane is displaced by an offset distance in axial direction with respect to the magnetic stator plane due to the mass of the rotor.

13. A rotational machine in accordance with claim 1, wherein the offset distance is at most 40% or at most 30% of the axial height of the rotor, in particular between 0.1% and 20% of the axial height of the rotor, especially between 1% and 10%, particularly preferably 3% to 5% of the axial height of the rotor.

14. A rotational machine in accordance with claim 1, wherein for the evaluation of the sensor signals and for the control and/or regulation of the equilibrium position of the rotor an actuator unit including an electronic data processing unit is provided.

15. A method for determining a tilting of a rotor of a rotational machine which rotational machine is adapted as a bearing-free engine including a stator designed as a bearing and drive stator having a magnetic stator plane wherein a magnetic rotor having a magnetic rotor plane is stored magnetically in contact free manner within the stator in the operational state, wherein an axial height of the rotor is selected smaller than or equal to a half diameter of the rotor and the rotor is stabilized passively by reluctance forces with respect to the magnetic stator plane both against an axial displacement and also against a tilting from an equilibrium position and a sensor unit having a first sensor and a second sensor is provided at the stator and for the determination of a deflection of the rotor from the equilibrium position a first sensor signal from a first measurement zone of the rotor is evaluated by means of the first sensor and a second sensor signal from a second measurement zone is evaluated by means of the second sensor, characterized in that for the determination of the tilting of the rotor relative to the magnetic stator plane a first control measurement zone which is part of the first measurement zone is provided either below or above the magnetic rotor plane at the rotor such that at least 50% of the first sensor signal generated from the first measurement zone is generated by the first control measurement zone at the first sensor, wherein the tilting of the rotor brings about a damping force on a tilting movement of the rotor via a differentiating portion of a radial position regulator.

16. A method in accordance with claim 15, wherein more than 50% of the first sensor signal generated from the first measurement zone is generated by the first control measurement zone at the first sensor.

17. A method in accordance with claim 15, wherein for the determination of the tilting of the rotor with respect to the magnetic stator plane, a second control measurement zone which is a part of the second measurement zone is provided below or above the magnetic rotor plane of the rotor at the rotor such that at least 50%, preferably more than 50% of the second sensor signal generated from the second measurement zone, is generated by the second control measurement zone at the second sensor.

18. A method in accordance with claim 15, wherein the first measurement zone and/or the second measurement zone is a measurement volume.

19. A method in accordance with claim 15, wherein the first measurement zone and/or the second measurement zone is a measurement area.

20. A method in accordance with claim 15, wherein the first control measurement zone and/or the second control measurement zone is arranged below the magnetic stator plane so that at least 55%, preferably at least 70%, in particular at least 90% and particularly preferably at least 95% of the first sensor signal generated from the first measurement zone is generated by the first control measurement zone and/or that at least 55%, preferably at least 70%, in particular at least 90% and particularly preferably at least 95% of the second sensor signal generated from the second measurement zone is generated by the second control measurement zone.

21. A method in accordance with claim 20, wherein at least 95%, preferably at least 97%, in particular more than 99% of a first maximum signal intensity is generated by the first measurement zone and/or wherein at least 95%, preferably at least 97%, in particular more than 99% of a second maximum signal intensity is generated by the second measurement zone.

22. A method in accordance with claim 15, wherein the first measurement zone and/or the second measurement zone is arranged above the magnetic rotor plane so that at most 99%, preferably at most 95% in particular at most 75%, amongst others at most 30% of the first maximum signal intensity and/or of the second maximum signal intensity is generated by the first measurement zone and/or by the second measurement zone.

23. A method in accordance with claim 15, wherein at least three sensors are provided for determining the deflection of the rotor from the equilibrium position.

24. A method in accordance with claim 15, wherein a sum of the first sensor signal of the first sensor and the second sensor signal of the first sensor is evaluated and/or wherein a difference between the first sensor signal of the first sensor and the second sensor signal of the first sensor is evaluated.

25. A method in accordance with claim 15, wherein the first sensor and/or the second sensor is a volume sensor, in particular an electromagnetic or magnetic sensor, especially an inductive sensor, a capacitive sensor or an eddy current sensor, and/or an optical sensor and/or an acoustic sensor and/or a different suitable sensor for the determination of the deflection of the rotor from the equilibrium position.

26. A method in accordance with claim 15, wherein in the operational state the magnetic rotor plane is displaced by an offset distance in axial direction with respect to the magnetic stator plane due to the mass of the rotor.

27. A method in accordance with claim 15, wherein the offset distance is set to at most 40% or at most 30% of the axial height of the rotor, in particular between 0.1% and 20% of the axial height of the rotor, especially between 1% and 10%, particularly preferably 3% to 5% of the axial height of the rotor.

28. A method in accordance with claim 15, wherein for the evaluation of the sensor signals and for the control and/or regulation of the equilibrium position of the rotor an actuator unit including an electronic data processing unit is provided.

29. A method in accordance with claim 15, wherein a damping force is electrically, magnetically, mechanically, hydraulically or pneumatically actuated onto the tilting movement of the rotor.

30. A processing plant comprising a rotational machine adapted as a bearing-free engine including a stator designed as a bearing and drive stator having a magnetic stator plane and a magnetic rotor having a magnetic rotor plane and supported magnetically in contact free manner within the stator, wherein an axial height of the rotor is smaller than or equal to a half diameter of the rotor and the rotor is stabilized passively by reluctance forces with respect to the magnetic stator plane both against an axial displacement and also against a tilting from an equilibrium position and a sensor unit having a first sensor and a second sensor is provided at the stator such that for the determination of a deflection of the rotor from the equilibrium position a first sensor signal from a first measurement zone of the rotor can be evaluated by means of the first sensor and a second sensor signal from a second measurement zone can be evaluated by means of the second sensor, wherein for the determination of a tilt of the rotor relative to the magnetic stator plane a first control measurement zone which is part of the first measurement zone is provided either below or above the magnetic rotor plane at the rotor such that at least 50% of the first sensor signal which can be generated from the first measurement zone can be generated by the first control measurement zone at the first sensor, wherein the tilting of the rotor brings about a damping force on a tilting movement of the rotor via a differentiating portion of a radial position regulator.

31. The processing plant of claim 30, wherein the plant is operated in accordance with a method for determining a tilting of the rotor of the rotational machine, wherein in the method for the determination of a deflection of the rotor from the equilibrium position the first sensor signal from the first measurement zone of the rotor is evaluated by means of the first sensor and the second sensor signal from the second measurement zone is evaluated by means of the second sensor, wherein at least 50% of the first sensor signal generated from the first measurement zone is generated by the first control measurement zone at the first sensor.

32. A rotational machine configured as a bearing-free engine, comprising:
　a stator configured to function as a bearing and drive stator, comprising a magnetic stator plane;
　a magnetic rotor comprising a magnetic rotor plane and supported magnetically in contact free manner within the stator, wherein an axial height of the rotor is smaller than or equal to a half diameter of the rotor, and the rotor is stabilized passively by reluctance forces with respect to the magnetic stator plane against both an axial displacement and a tilting from an equilibrium position; and
　a sensor unit disposed on the stator, wherein the sensor unit comprises at least one sensor configured to determine a deflection of the rotor from the equilibrium position;
　wherein the sensor is associated with a spatial angular region defined by a portion of three-dimensional space from which the sensor can receive meaningful information, wherein the sensor faces a surface of the rotor, wherein the surface of the rotor comprises a measurement zone defined by that portion of the surface of the rotor that falls within the spatial angular region, and wherein the surface of the rotor further comprises a control measurement zone defined by that portion of the measurement zone that falls on a single side of the magnetic rotor plane;
　and wherein the sensor unit is configured to determine the deflection of the rotor from the equilibrium position by utilizing a signal from the sensor taken at only the control measurement zone.

33. A method for determining a tilting of a rotor of a rotational machine,
　wherein the rotational machine is configured as a bearing-free engine, comprising:
　　a stator configured to function as a bearing and drive stator, comprising a magnetic stator plane;
　　a magnetic rotor comprising a magnetic rotor plane and supported magnetically in contact free manner within the stator, wherein an axial height of the rotor is smaller than or equal to a half diameter of the rotor, and the rotor is stabilized passively by reluctance forces with respect to the magnetic stator plane against both an axial displacement and a tilting from an equilibrium position; and
　　a sensor unit disposed on the stator, wherein the sensor unit comprises at least one sensor configured to determine a deflection of the rotor from the equilibrium position;
　　wherein the sensor is associated with a spatial angular region defined by a portion of three-dimensional space from which the sensor can receive meaningful information, wherein the sensor faces a surface of the rotor, wherein the surface of the rotor comprises a measurement zone defined by that portion of the surface of the rotor that falls within the spatial angular region, and wherein the surface of the rotor further comprises a control measurement zone defined by that portion of the measurement zone that falls on a single side of the magnetic rotor plane;
　the method comprising:
　　capturing, in the sensor, a signal, taken at only the control measurement zone; and
　　determining the deflection of the rotor from the equilibrium position by utilizing the signal.

\* \* \* \* \*